United States Patent [19]

Kolavcic et al.

[11] Patent Number: 4,887,471
[45] Date of Patent: Dec. 19, 1989

[54] COMPENSATION FOR SENSITIVITY DRIFT IN MAGNETOELASTIC FORCE TRANSDUCERS

[75] Inventors: Pavel Kolavcic; Jarl Sobel; Lars Örnholmer, all of Västerås, Sweden

[73] Assignee: Asea Brown Boveri AB, Västerås, Sweden

[21] Appl. No.: 230,995

[22] Filed: Aug. 11, 1988

[30] Foreign Application Priority Data

Aug. 24, 1987 [SE] Sweden ............................. 8703267

[51] Int. Cl.$^4$ .............................................. G01L 1/12
[52] U.S. Cl. ............................ 73/862.69; 73/DIG. 2
[58] Field of Search ................ 73/779, 862.69, DIG. 2

[56] References Cited

U.S. PATENT DOCUMENTS 4,541,289  9/1985  Valdemarsson ................. 73/862.69

FOREIGN PATENT DOCUMENTS 446777  12/1974  U.S.S.R. ........................... 73/862.69

Primary Examiner—Charles A. Ruehl
Attorney, Agent, or Firm—Watson, Cole, Grindle & Watson

[57] ABSTRACT

A magnetoelastic force transducer which is compensated for sensitivity drift is provided with a measuring transducer and a reference transducer (1) of the same material. In its simplest form the reference transducer may consist of a toroid. The two transducers are arranged in good thermal contact with one another. The reference transducer is arranged with a winding (2) for excitation with a current which at each moment is proportional to the supply current of the measuring transducer, and with a winding (3) for delivering a reference signal ($U_r$) proportional to its magnetic flux. The output signal of the reference transducer is rectified in a phase-sensitive rectifier, the output signal of which is compared with a constant reference voltage. The deviation controls the phase position of the control voltage of the rectifier in such a way that the output signal of the rectifier is caused to correspond to the reference voltage. The output signal of the measuring transducer is rectified in a phase-sensitive rectifier, which is controlled by said control voltage and the output signal of which constitutes the temperature-compensated measured signal.

4 Claims, 2 Drawing Sheets

COMPENSATION FOR SENSITIVITY DRIFT IN MAGNETOELASTIC FORCE TRANSDUCERS

TECHNICAL FIELD

The present invention relates to a magnetoelastic force transducer, compensated for sensitivity drift, comprising a reference transducer, a measuring transducer, means for excitation of the measuring transducer and the reference transducer, and signal processing means adapted to generate the output signal of the force measuring means in dependence on the output signals of the measuring transducer and the reference transducer.

BACKGROUND ART, PROBLEMS

Magnetoelastic force measuring means are previously known, for example from Swedish Patent No. 151 267. These force measuring means have a transducer comprising a core with an excitation winding, supplied with alternating current, and a measuring winding. The voltage induced in the measuring winding is usually rectified, suitably with the aid of a phase-sensitive rectifier, and the magnitude of the rectified voltage constitutes a measure of the force applied to the transducer.

A drawback of certain transducers of the above-mentioned kind is, however, that the temperature dependence of the sensitivity and other forms of drift, caused, for example, by amplitude or frequency changes in the magnetizing current, make it difficult or impossible to measure with very high precision.

Swedish Patent No. 430 541 discloses one way of greatly reducing sensitivity drift problems of the above-mentioned kind. In this patent, a reference transducer of the same material and with the same design as the measuring transducer is used. The two transducers are given the same excitation and are arranged in good thermal contact with one another. A spring with a special shape loads the reference transducer with a constant force. The output signal of the reference transducer is rectified in a phase-sensitive rectifier, the output signal of which is compared with a constant reference voltage. The deviation controls the phase position of the control voltage of the rectifier in such a way that the output signal of the rectifier is caused to correspond to the reference voltage. The output signal of the measuring transducer is rectified in a phase-sensitive rectifier, which is controlled by the mentioned control voltage and the output signal of which constitutes the temperature compensated measured signal.

In the device of SE 430 541, thus, the signal flux of the reference transducer, the secondary flux, is measured at a constant applied force from the above-mentioned spring. This flux gives rise to a signal which is kept constant by changing that current at which the phase-sensitive rectifier commutates. This method for reducing the sensitivity drift in magnetoelastic force transducers can reduce the drift problems very drastically. In practice, however, it has proved that this method has certain drawbakcs. A condition for the compensation of the drift according to the method under discussion—with a reference transducer loaded with a constant force—to function satisfactorily is that the force on the reference transducer is prevented from being influenced by the measuring transducer being loaded. This would in such case cause an impermissible variation of the reference signal which is not due, for example, to temperature variations. This has been found to be difficult to achieve in practice; it renders the mounting more expensive and results in a certain amount of rejections.

Because of differences between the measuring transducer and the reference transducer, a pre-trimming is also normally necessary, which may be relatively difficult to achieve.

Otherwise, the specially designed reference transducer and the spring for maintaining a constant force entail a high manufacturing cost.

DISCLOSURE OF THE INVENTION, ADVANTAGES

This invention comprises measuring the primary flux in a reference transducer instead of measuring a secondary or measurement flux in a reference transducer. This reference transducer may, for example, be formed as a toroid. This flux generates a signal via a secondary winding with a suitable number of turns. This signal is maintained constant in the same way as in SE 430 541 by changing the commutating current. In the same way as the reference transducer described in SE 430 541, the reference transducer according to the present invention must, of course, be applied on the measuring winding with good thermal contact. The reference transducer is made of the same material as the measuring transducer. The magnetomotive force which propels the primary flux is dimensioned such that the primary flux in the reference transducer is of the same order of magnitude as in the measuring zone of the measuring transducer. The exact dimensioning of the primary flux in the reference transducer is used to fine-trim the temperature compensation.

The number of secondary turns of the reference transducer are chosen so that the phase-sensitive rectifier is utilized in full without becoming saturated to obtain the best signal/noise ratio.

The new reference transducer, consisting of a toroid, is, of course, much simpler and cheaper to construct than the previously mentioned reference transducer with the specially formed spring.

If for some reason, for example during a transition stage in the production, it is desired to maintain the reference transducer with the previously mentioned design, however without the spring, the invention also allows the primary flux to be measured in the measuring zone of that reference transducer by winding a few winding turns around the measuring zone in parallel with the primary winding. An example of this will be described under "Description of the Preferred Embodiments".

Introducing changes comprising a switchover from measuring a secondary flux to measuring a primary flux is completely compatible with the electronics described in SE 430 541 after a very simple change, since sensing is to be performed whether the reference signal is positive or negative and, in accordance therewith, be controlled to a positive or a negative reference value. A more detailed description of this will be made under "Description of the Preferred Embodiments".

In all, the invention allows for a considerably simpler drift reducing method and using considerably simpler components from the manufacturing point of view.

A short description of the theoretical basis of the invention, along with a comparison with the corresponding basis for the compensation method described in SE 430 541, will be given below.

In SE 430 541 the aim is to obtain an exact identity between the reference transducer and the measuring transducer. Ideally the following were obtained $$\frac{\partial K_L}{\partial T} = \frac{\partial U_r}{\partial T} \tag{1a}$$

$$\frac{\partial K_L}{\partial I_k} = \frac{\partial U_r}{\partial I_k} \tag{1b}$$

where where
$K_L$ = the sensitivity of the measuring transducer
$U_r$ = the signal of the reference transducer
$I_k$ = the commutating current
$T$ = the temperature
Now, if $$U_r(I_k(T), T) = \text{constant} \tag{2}$$

a perfect temperature compensation is obtained since, after differentiation, $$\frac{\partial U_r}{\partial T} = \frac{\partial U_r}{\partial I_k} \cdot \frac{dI_k}{dT} + \frac{\partial U_r}{\partial T} = 0 \tag{3}$$

that is, $$\frac{dI_k}{dT} = -\frac{\frac{\partial U_r}{\partial T}}{\frac{\partial U_r}{\partial I_k}} \tag{4}$$

and in similar manner $$\frac{\partial K_L}{\partial T} = \frac{\partial K_L}{\partial I_k} \cdot \frac{dI_k}{dt} + \frac{\partial K_L}{\partial T} = \frac{\partial K_L}{\partial I_k} \cdot \left[ -\frac{\frac{\partial U_r}{\partial T}}{\frac{\partial U_r}{\partial I_k}} \right] + \frac{\partial K_L}{\partial T} \tag{5}$$

If (1a) and (1b) are fulfilled, (5) will be equal to zero and a perfect temperature compensation is obtained.

The important point in this invention is that (1a) and (1b) can be replaced by the considerably less stringent requirement $$\frac{\frac{\partial K_L}{\partial I_k}}{\frac{\partial K_L}{\partial T}} = \frac{\frac{\partial U_r}{\partial I_k}}{\frac{\partial U_r}{\partial T}} \tag{6}$$

which, of course, also means that if $$\frac{\partial U_r}{\partial I_k} \neq 0$$

equation (5) will be equal to zero. Thus, it is this realization that is utilized to obtain temperature compensation in accordance with the new, simpler method.

Since the relationships described above apply differentially, the temperature compensation will be perfect in the entire temperature range in which (1a) and (1b) are valid, regardless of whether the relationships are linear or not.

DESCRIPTION OF THE PREFERRED EMBODIMENTS

Figure 1:
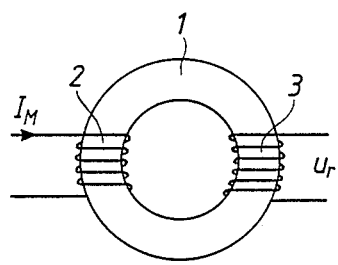
FIG. 1 shows a preferred embodiment of a reference transducer.

In accordance with the principle of a reference transducer, at least one reference transducer is now arranged in good thermal contact with the measuring transducer. As described above, such a reference transducer may consist of a toroid 1, in principle as shown in FIG. 1. The primary winding 2 is series-connected to the excitation winding(s) of the measuring transducer and is thus traversed by the common exciting current $I_M$. The reference voltage $U_r$, which is supplied to the electronics circuit according to FIG. 4, is induced in the secondary winding.

Figure 2:
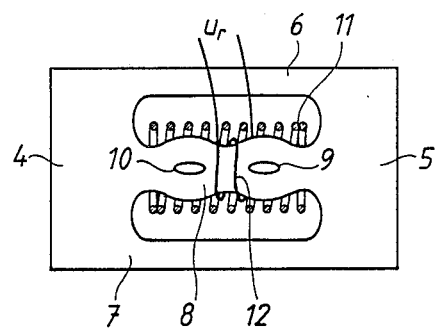
FIG. 2 shows an alternative embodiment of the core in a reference transducer with the core package largely designed as the core package of the measuring transducer.

An alternative embodiment of a reference transducer is shown in FIG. 2. It is mainly formed as the measuring portions of a measuring transducer, for example as described in SE 430 541. The core has two side parts 4 and 5 which are interconnected by three beams 6, 7 and 8. The central beam has two holes 9, 10 into which, when the core is used as a measuring transducer, a measuring winding is inserted (not in the reference transducer). Opposite to the holes the beam is provided with wider portions in such a way that the cross-section of the beam is substantially constant along the length of the entire beam. The beam is surrounded by an excitation winding 11, supplied with alternating current, which provides an axial alternating flux through the beam. As mentioned previously, the excitation winding is connected in series with the corresponding windings on the measuring transducer. The secondary winding 12 of the reference transducer for measuring the primary flux thereof is wound in parallel with the primary winding.

Figure 3:
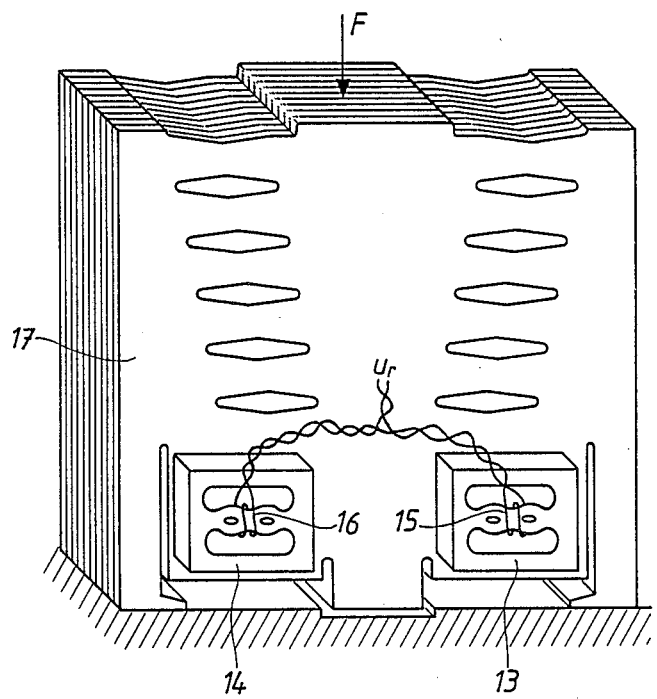
FIG. 3 shows a further alternative embodiment of a reference transducer applied to a core package formed for force shunting.
Figure 4:
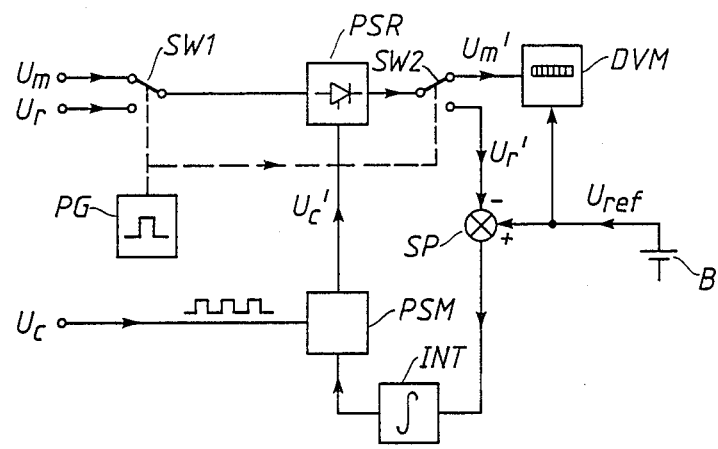
FIG. 4 shows the signal processing circuit in a force measuring transducer according to the invention.

FIG. 4 of EP 0 089 916 ("Magnetoelastic force transducer") illustrates an example of the embodiment of a core package, in which it is necessary to shunt part of the force to be measured. Different embodiments of reference transducers applied to such a package may be used. An example is given in FIG. 3 of the present invention, in which two reference transducers 13 and 14 with respective primary flux measuring windings 15 and 16 are positioned with good thermal contact against the force-shunted measuring transducer 17. The excitation windings and the windings of the measuring transducers are not shown.

As mentioned below, the signal processing in the present invention is practically identical with the signal processing described in SE 430 541. However, the principle of the signal processing will also be described here and with reference to FIG. 4.

The measuring transducer signal $U_m$ and the reference transducer signal $U_r$ are switched alternately into a phase-sensitive rectifier PSR. The switching is symbolically shown by the switch SW1. The switch SW1 as well as the switch SW2 are controlled by a control device PG, so that the reference transducer signal is only switched into the rectifier PSR during a calibrating period of, for example, a few tenths of a second every twentieth second, the rectified signal $U_r'$ then being passed on via the symbolically shown switch SW2 to the negative input of a difference generator SP, to the positive input of which a reference d.c. voltage $U_{ref}$ from a d.c. voltage source B is connected. Via an integrator INT, the output signal of the difference generator is supplied to a control input of phase shift device PSM, which is also supplied with a reference a.c. voltage $U_c$ with the same frequency as the supply a.c. to the excitation windings of the transducer and with a fixed phase position in relation to this alternating current. The output signal of the integrator controls the phase shift in the device PSM and hence the phase angle $\alpha$ of the phase-sensitive rectifier PSR, so that the output voltage $U_r'$ of the rectifier becomes equal to $U_{ref}$. During the calibrating periods the resultant signal amplification is thus adjusted, by the control of the phase angle $\alpha$, so that the temperature dependence of the sensitivity is compensated for. When after each calibrating period the measuring transducer is switched in, the integrator maintains the phase angle unchanged.

It is self-evident that $U_r$ and $U_m$ can be supplied to respective phase-sensitive rectifiers, the commutation of which is controlled by the same commutating signal $U_c'$. The switching between these two rectifiers must be controlled, as described above, by the pulse transducer PG.

A condition for obtaining the correct compensation is, of course, that the magnetoelastic properties are the same in the sheet material of the two transducers. To ensure that this is the case, the material should be selected from adjacent parts of the same sheet.

The temperature-compensated measured signal $U_m'$ is finally displayed on a digital voltmeter DVM. This also receives its reference voltage from $U_{ref}$, the digital measured value thus being compensated for a variation of $U_{ref}$.

Figure 5:
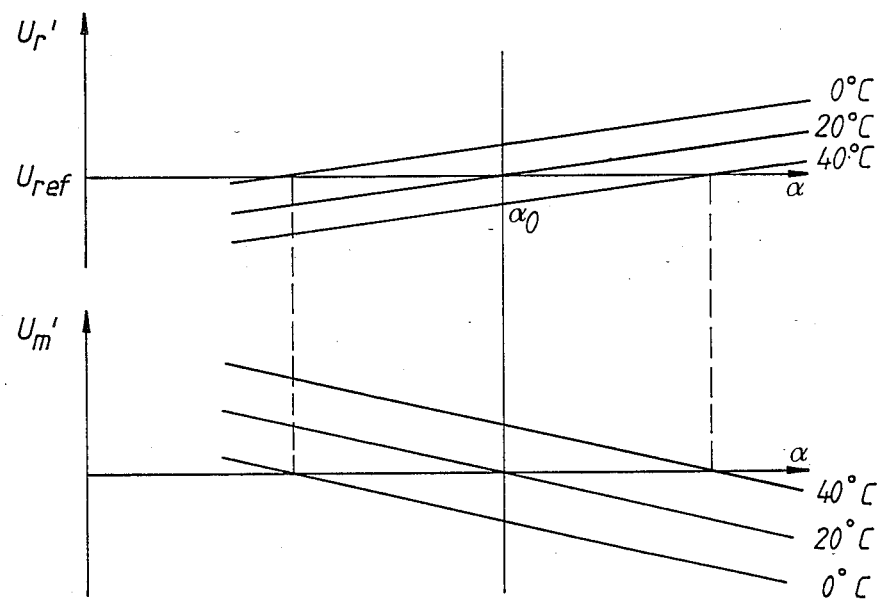
FIG. 5 shows the output signals from the measuring and reference transducers as a function of the commutating angle and the temperature.

The compensation of the temperature dependence of the transducer is illustrated in FIG. 5. For simplicity, the relationships have been assumed to be linear, although—as mentioned above—the temperature compensation is valid for non-linear relationships as well. Since according to the invention it is a question of measuring a primary flux, a positive rate of change of $U_r'$ is obtained with increasing commutation ($I_k$ or $\alpha$), in contrast to the compensation shown in SE 430 541, while at the same time $U_r'$ decreases with increasing temperature.

After amplification and phase-sensitive rectification with a fixed phase angle $\alpha$ of the two transducer signals $U_m$ and $U_r$, the direct voltages $U_m'$ and $U_r'$ are obtained, which, like the transducer signals, have a certain temperature dependence, here illustrated for the temperatures 0°, 20° and 40° C. With the aid of the signal processing equipment described, the phase angle $\alpha$ is changed during the calibrating period so that $U_r'$ becomes equal to the constant reference voltage $U_{ref}$, independently of the temperature of the reference transducer. When the phase angle is then maintained unchanged during the measurement period, also $U_m'$ will become independent of the temperature, since the temperature of the measuring transducer, because of good metallic contact, is equal to that of the reference transducer.

We claim:

1. A magnetoelastic force transducer compensated for sensitivity drift, comprising:
    a measuring transducer providing an output measuring signal;
    a reference transducer made of the same material as the measuring transducer and arranged in good thermal contact with the measuring transducer to ensure temperature conformity between said measuring transducer and said reference transducer;
    excitation means supplying current through said reference transducer proportional to the supply current through said measuring transducer;
    said reference transducer including a winding for providing a reference signal proportional to the magnetic flux;
    a phase-sensitive rectifier selectively receiving one of said reference signal and said output measuring signal in addition to a control voltage and providing an output signal during a respective
    calibrating period and a measurement period;
    a difference generator receiving said output signal and a reference voltage and providing a difference output;
    means responsive to said difference output for controlling the output of said phase-sensitive rectifier by controlling the phase position of said control voltage to be equal to said reference voltage;
    the output measuring signal of said measuring transducer is input to said phase-sensitive rectifier during said measurement period; and
    said phase-sensitive rectifier controls said control voltage and the output signal constituting the drift-compensated measured value during said measurement period.

2. A magnetoelastic force transducer according to claim 1,
    further comprising control means for connecting, during the calibrating period, the output signal of the rectifier to the difference generator to obtain that phase position of the control voltage which causes the output signal of the rectifier to become equal to the reference voltage, and the means for controlling the phase position of the control voltage are arranged such that the phase position for the control voltage, obtained during the calibrating period, is retained during the immediately following measurement period during which the output signal of the phased-sensitive rectifier is
    supplied to a signal processor.

3. Force measuring transducer according to claim 1, wherein the reference transducer includes a core formed as a toroidal core.

4. Force measuring transducer according to claim 1, wherein the reference transducer and the measuring transducer each include a core formed from the same sheet section.

* * * * *